Figure 1:
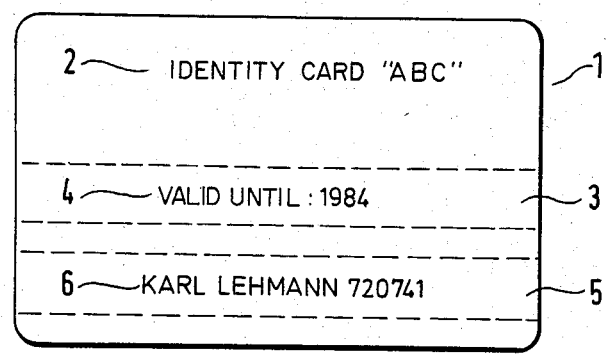

United States Patent [19]

Maurer et al.

[11] Patent Number: 4,507,346
[45] Date of Patent: Mar. 26, 1985

[54] MULTILAYER IDENTIFICATION CARD AND A METHOD OF PRODUCING IT

[75] Inventors: Thomas Maurer; Hans-Jürgen Holbein; Joseph S. Lass, all of Munich, Fed. Rep. of Germany

[73] Assignee: GAO Gesellschaft fur Automation und Organisation mbH, Munich, Fed. Rep. of Germany

[21] Appl. No.: 478,714

[22] Filed: Mar. 25, 1983

[30] Foreign Application Priority Data

Apr. 8, 1982 [DE] Fed. Rep. of Germany ....... 3213315

[51] Int. Cl.³ .......................... A23C 9/12; B32B 3/30
[52] U.S. Cl. .................................. 428/158; 283/107; 283/111; 283/904; 427/43.1; 427/53.1; 427/264; 427/275; 428/211; 428/913; 428/916
[58] Field of Search ............... 428/13, 158, 159, 160, 428/211, 913, 916; 283/107, 111, 904; 427/43.1, 53.1, 264, 275

[56] References Cited

U.S. PATENT DOCUMENTS 3,627,858 12/1971 Parts et al. ........................ 428/156
3,949,028 4/1976 Murakami et al. ................. 428/178
4,268,615 5/1981 Yonezawa ......................... 430/320

FOREIGN PATENT DOCUMENTS 995274 8/1976 Canada .
2650216 5/1977 Fed. Rep. of Germany .
2735138 2/1979 Fed. Rep. of Germany .
2044175 10/1980 United Kingdom .

Primary Examiner—William J. Van Balen
Attorney, Agent, or Firm—Bacon & Thomas

[57] ABSTRACT

A multilayer identification card bearing information such as letters, numbers, patterns, pictures and so on, in which at least part of the information is present in the form of a structure in relief in a foamable synthetic material. The foamable synthetic material is transparent or dyed in the visible spectral range and is present in the identification card in the form of a layer covering either its entire surface or part of it. The information in relief is produced by means of a laser beam recorder, the energy dosage of which is used to induce the locally controllable foaming process in the synthetic material compounded with chemical or physical blowing agents. The protection against forgery may be further increased by additionally photocuring the foamable synthetic layer.

30 Claims, 9 Drawing Figures

MULTILAYER IDENTIFICATION CARD AND A METHOD OF PRODUCING IT

The invention relates to a multilayer identification card carrying information in the form of letters, numbers, patterns, pictures, etc., in which at least part of the information appears in relief in a manner suitable for printing. The invention also relates to a method of producing a relief suitable for printing in a foamable synthetic material.

Identification cards in the form of credit cards, bank cards, cash payment cards and so on are being used in increasing numbers in a great variety of service sectors, for cashless transfers and within companies. Due to their wide use, they are typical mass products, on the one hand; i.e. they must be simple and inexpensive to produce. On the other hand, however, they must be designed in such a way so as to be protected to a maximum degree against forgery and falsification. The variety of types of identification cards already on the market or in the process of being developed testifies to the efforts of this industry to optimize the two abovementioned counteracting conditions.

In particular, it is necessary to protect the data relating to the card owner, which are applied during the so-called "personalization" of the identification card, in such a way that they cannot be subsequently manipulated. One possibility which has proven to be very useful in practice is to embed a paper inlay designed as a security print in a multilayer card. The paper inlay, provided with authenticity features such as watermarks, security threads, steel intaglio printing, etc. as used in the production of security paper, meets the highest demands on security and is protected against all kinds of attempted forgery and falsification due to the data being protected by transparent cover films.

Mainly because they are much simpler and cheaper to produce, all-plastic identification cards are also used in the identification card sector, in which the identification card data and the overall printed pattern are applied to the outer surface of a small plastic card which may have a multilayer construction. In various embodiments of such identification cards, the user-related data (name, account number, etc.) are printed through the card from the back so as to appear in relief on the front. They are used to transfer the personalization data onto bills, etc. by means of an ink ribbon in the various places of sale.

Although this kind of all-plastic identification card has the advantage of being inexpensive, it is a considerable shortcoming that the directly accessible printed pattern and personalization data are susceptible to being falsified with relatively little protection. Since the card materials are usually thermoplasts, in particular PVC, the embossed data can be "ironed flat" and printed over with other data relatively easily by a manipulator.

The printed pattern can be removed, if necessary, by means of readily available chemical solvents and be replaced or added to by another pattern.

In order to improve the legibility of the embossed data, the raised areas of the embossed writing are colored. However, the color is exposed to great wear in these areas, so that the legibility of the data varies considerably and constantly changes in the course of time. It is therefore not possible to use this type of card in automatic optical card readers. This type of card cannot be used universally, either, since it is not possible to provide photos inside the identification card.

Finally, it must be mentioned that the identification cards are stressed in an extremely non-uniform manner by the embossing process, which usually leads to deformation of the card body. Thus difficulties do not only arise for the producer with respect to packaging, storage, etc., but also in connection with the use of these identification cards in general automatic identification card testing devices, e.g. for the reading of magnetic data.

A further disadvantage is the relatively elaborate production process, since the personal data present in the form of printed and embossed information must be applied to the card in different procedural steps and devices.

The optical appearance of the identification card is further disturbed by the fact that the data is embossed through the card from the back in the usual embossing processes, and the resulting depressions on the back of the card destroy or greatly detract from any printed pattern or other information which may be located there.

German Offenlegungsschrift No. 22 23 290 does disclose a method by which the embossed data only appear on one card surface, but the method is even more elaborate than conventional embossing procedures. A particular disadvantage is that the embossed data are not applied in a usual embossing device in a separate working step, independently of the printed information, but rather a special laminating device is required containing a replaceable negative die-plate with the variable personal data on it, which must be separately produced for each card and changed each time before lamination.

An identification card which meets the requirements with respect to security and production especially well is disclosed in German patent no. 29 07 004. It consists of a card inlay of paper and a transparent cover film, the personal data being inscribed in the card inlay after the cover film has been laminated on by means of a laser beam. The relevant information may be burned into the inlay or else be present in the form of a color change in a thermosensitive coating applied to the inlay. A relief-type structure which may optionally appear on the card surface may be manually checked as being a characteristic card feature, but it is not suitable for reproducing the data due to the shallowness of the relief and its crater-like shape.

Methods are also known for producing data in relief on synthetic films which are based on the expandability of synthetic films compounded with blowing agents exposed to thermal radiation. However, these methods are not suitable for producing identification cards since the procedural sequence does not allow for flexible handling of the personalization data which vary from identification card to identification card.

A method of producing relief-type structures on sheets or plates made of foamable synthetics is described, for example, in German Offenlegungsschrift No. 27 35 138. A layer of toner is applied to the outer layer of the foamable plastic in areas where the relief-type structure is to be produced. Subsequent illumination with a strong light source leads, since the plastic is heated to different degrees depending on the absorptive power of the toner layer, to this layer swelling up to a greater or lesser extent and thus to the production of a relief-type structure.

The disadvantage involved in these methods is that they require different procedural steps and great technical resources, e.g. for the application of the toner layer, which is either done manually, by printing processes or electrophotographic techniques.

Another method is disclosed in German Auslegeschrift No. 26 50 216 using a photocurable, foamable plastic which is exposed to UV light in the desired pattern, so that the exposed areas cure. When the entire layer is then heated, the volume of the synthetic layer increases in the uncured places, leading to a structure in relief.

This method also involves the disadvantage of different procedural steps which, due to the necessary technical resources, stand in the way of rational and inexpensive production, e.g. in the identification card sector.

The problem on which the invention is based is thus to provide an identification card to meet the requirements with respect to security and production, but not involving the above-mentioned disadvantages, and also to provide a method of producing same.

The problem is solved according to the invention by the features stated in the characterizing part of the main claim.

An inventive identification card, designed to be a multilayer laminate, is characterized by having areas which are expandable when heat energy is supplied. The material used is thermoplastic synthetic material, preferably PVC material, compounded with chemical or physical blowing agents. Suitable synthetics and blowing agents are listed, for example, in German Offenlegungsschrift No. 24 50 948, German Auslegeschrift No. 26 50 216 and German Auslegeschrift No. 29 21 011.

The physical blowing agent used is a readily evaporating hydrocarbon: pentane, hexane, chlorinated hydrocarbon such as methylene chloride, trichloroethane and chlorine-fluorinealkane (frigen). It is mixed with the synthetic material to be foamed, for example in a microencapsulated form, evaporates or expands when heat energy is supplied and thus causes a local increase in volume in the thermoplastic synthetic layer when the softening point thereof is exceeded.

Chemical blowing agents which are mixed with the synthetic material to be foamed when it is being prepared, unencapsulated like pigments, are substances which decompose at high temperatures forming inert gases and odorless and tasteless, non-toxic residue. They are predominantly azo compounds, N-nitroso compounds and sulfonylhydrazides which split off 100 to 300 ml nitrogen per gram blowing agent at starting temperatures between approximately 90° and 275° C., and cause a local increse in volume of the softened synthetic layer in the heated area due to the released gases.

The foamable synthetic layer may be designed as a cover film, one layer in a multilayer cover film or as a layer on the card inlay. In identification cards having a paper inlay designed as security paper, or in dyed all-plastic inlays provided with a printed pattern, transparent synthetics containing blowing agent are used, which are laminated onto the card inlay as a cover layer or as part of a cover layer. It is also possible to laminate a synthetic strip containing a blowing agent into a conventional PVC cover film.

Preferably in all-plastic identification cards, the synthetic material containing a blowing agent may also be located in the card inlay, i.e., for example, as a layer in a card core acting as a carrier, or as a strip in the area intended to take up the embossed data. In this case, less demands must be made as far as the color of the synthetic material and the blowing agent are concerned, since the card inlay is generally dyed or opaque and is provided with printed patterns over all or part of its surface. Additional mechanical protection is furthermore obtained by the transparent cover films usually laminated over the inlay.

The type of laminating process depends on the synthetics and blowing agents used. The hot laminating method used to laminate PVC cover films, during which temperatures of about 180° C. are reached, presupposes that the blowing agents are not yet activated or cannot develop their effect at these temperatures. In the case of chemical blowing agents, this is not much of a problem since enough blowing agent is available whose starting temperature is considerably higher than 180° C., e.g. azodicarbonamide, with a starting temperature of 230° to 235° C.

In the case of physical blowing agents, one can work with a laminating pressure which is high enough to prevent expansion of the blowing agent and then cool under high pressure.

If the type of synthetic material and blowing agent do not allow for hot lamination, the films can be connected by so-called "cold laminating" methods or gluing techniques, which make less demands on the thermal and mechanical properties of the synthetic material containing a blowing agent.

The methods proposed to produce the information in the form of letters, numbers and/or patterns, represented in relief, are distinguished by the fact that the heat energy required to trigger the foaming process is supplied by a laser beam recorder so as to be precisely definable locally and readily controllable.

The absorption of the laser light, or rather, its conversion into heat energy, takes place, when the synthetic material is appropriately selected, in the latter itself, in special additional absorptive layers directly adjacent to the foamable film or in the card inlay which transmits the heat energy to the foamable synthetic film.

To protect the data in relief from subsequent manipulation, one can deactivate the non-activated remaining blowing agent after the data in relief have been produced, and/or cure the layer containing the blowing agent with light, i.e. UV light or light of the visible spectral range. Appropriate substances are listed, for example, in German Auslegeschrift No. 26 50 216.

To increase protection against forgery, it is further possible to obtain a change of color in the card inlay congruent to the data in relief by means of the laser beam recorder while producing these data, so that the information present in the data in relief is present additionally on the card inlay. This counts as a further authenticity feature and prevents any attempted falsification such as re-embossing from the start.

This kind of attempted falsification is relatively hopeless, anyway, since gases are released by the blowing agents when data in relief are produced in foamable films, creating a microstructure which is additionally consolidated and stabilized by polymerization and decomposition reactions induced by the laser energy and taking place in the synthetic material, so that it is hardly possible to "iron out" the data in relief even without photocuring.

The inventive method allows not only for data in relief to be produced but also for unembossed information to be written on. In order to prevent the blowing agent from being activated or undesirable relief-type protrusions from appearing in the cover film while the card inlay is being written on with the laser beam recorder, several things may be done. One possibility is to provide a synthetic material containing a blowing agent only in the area intended to receive the data in relief, e.g. by laminating a synthetic strip containing a blowing agent in or on the cover film or by applying this strip to the card inlay (before lamination). Another possibility, if a synthetic layer containing a blowing agent is provided across the surface, is to cure the entire identification card by means of photocuring before it is written on, leaving out the area intended to receive the data in relief.

Yet another possibility is to apply in the area on the card inlay intended to receive the "laser writing" (data on the card inlay or in the cover film, but not in relief) a thermosensitive coating which reacts with a change of color to a proper dose of laser energy below the starting temperature of the blowing agent, so that the "laser writing" is only present in the thermosensitive layer.

It is an advantage of these identification cards and this writing method that the use of a laser beam recorder causes an immediate increase in the volume of the foamable synthetic layer which can be precisely defined locally, so that the information or pattern to be applied appears on the card surface in a relief-type structure suitable for printing. By adjusting the dosage of laser energy, i.e. the "period of radiation" and intensity, the height of the relief can be precisely controlled according to one's wishes. It is also particularly advantageous that the mere adjustment of the dosage of laser energy makes it possible to produce both normal data and data in relief, so that the identification card can be completely personalized in one operation in the same device, i.e. a laser beam recorder.

Summing up, reference is made to the great variety of possibilities and advantages offered by the inventive method of producing data in relief on identification cards. The extraordinarily great variability as to the selection and combinability of card materials, thermoplastic synthetics, chemical and physical blowing agents, thermosensitive and laser absorption layers, photocuring methods and laminating techniques opens up completely new vistas for the production of data in relief on identification cards in connection with the rational and up-to-date laser writing process; the above examples are only a small selection of these possibilities. The protection against forgery and falsification provided for this kind of data in relief produced by a laser beam recorder is considerably greater than in the case of conventional embossing methods which allow for the possibility of re-embossing. In addition to the fact that in this method an irreversible gas microstructure is produced in the foamable synthetic layer, the additional photocuring and possible congruent inscription of the data in relief on the card inlay make any attempted forgery or falsification quite hopeless from the start.

It is an essential advantage of this method that the entire personalization of the identification cards, whether central or decentral, may be carried out in one device, i.e. with the same laser beam recorder. Thus finished laminated credit cards, for example, may be easily and quickly provided with the relevant personal data of the customers by a wholesale chain on its own, in one case in the form of data in relief for transfering important data onto vouchers, etc., and in the other case in the form of exclusively visible data present on the inlay or in the film as laser writing, which are only subject to visual checking or are to be read automatically directly off the card without appearing as printing on a voucher. There are no limits on the possible applications in this respect.

It is clear to an expert that the method of producing embossing in relief by means of a laser beam recorder is not limited to identification cards but may also be transfered without any problem to all other areas in which information in the form of letters, numbers, patterns, pictures or even photos (photos in relief) is to be produced in foamable synthetic materials in the form of relief-type structures.

In the following, various embodiments of the invention shall be described by way of example with reference to the drawings. These show:

FIG. 1 an inventive identification card from the top

Figure 6:
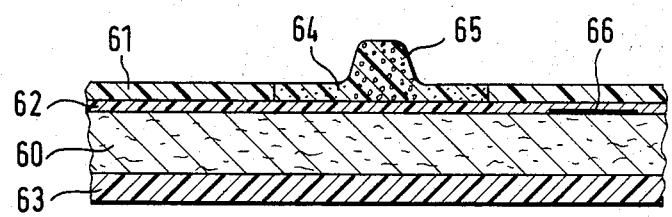
Figure 7:
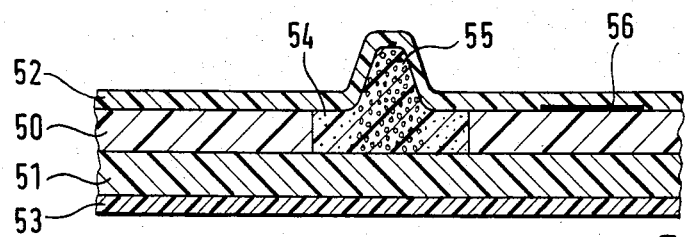
Figure 8:
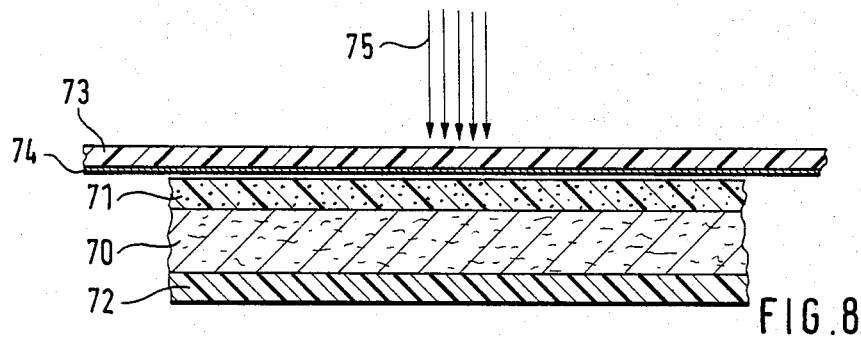
Figure 9:
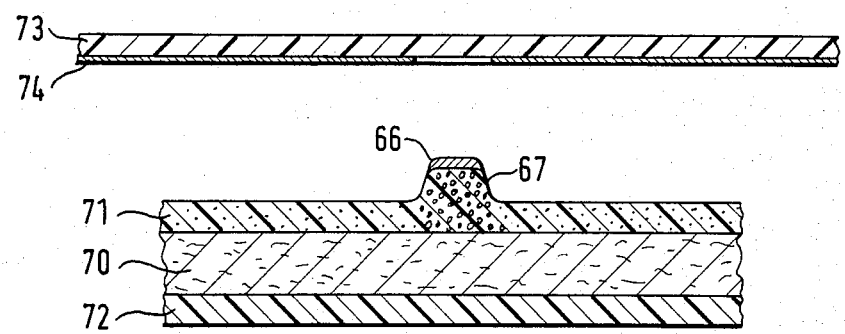

FIGS. 2–7 various embodiments of an inventive identification card in cross-section FIGS. 8–9 a special method of increasing the absorptive power of the foamable synthetic material FIG. 1 shows an inventive identification card 1 having a conventional printed pattern 2 on the card inlay, laser writing 4 present in the cover film or on the card inlay in the area 3 provided for normal laser data, and inventively produced data in relief 6 in the area 5 intended for data in relief.

Figure 2:
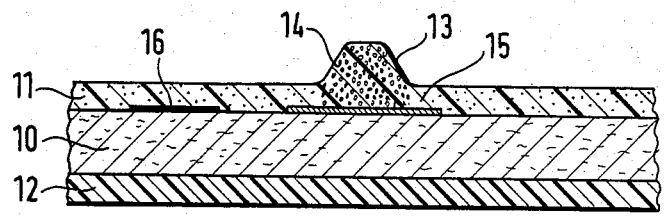

FIG. 2 graphically shows part of identification card 1 in cross-section. Card inlay 10 designed as security paper or of synthetic material is laminated between two transparent cover films 11,12, whereby cover film 11 is compounded with a physical or chemical blowing agent which causes foaming when heat is supplied so that cover film 11 exhibits in this area a relief 13 the height of which is dependent upon the amount of energy supplied.

When physical blowing agents such as pentane, hexane, heptane, chlorinated hydrocarbon or chlorine-fluorine-alkane are used, they are added to the thermoplastic cover film material in a microencapsulated form. When heat energy is supplied, an increase in volume of the microcapsules is produced in the heated area as soon as the softening point of the thermoplastic cover film material is exceeded.

Chemical blowing agents which are suitable in the same way but are preferably used are, for example, azo compounds, N-nitroso compounds and sulfonylhydrazide which split off 100 to 300 ml nitrogen per gram blowing agent at starting temperatures between approximately 90° and 275° C. They are added to the synthetic material of the cover film like pigments during its preparation. Above the starting temperature the released gases 14, the quantity of which can be controlled by the heat energy supplied, also cause the softened cover film to foam in the heated area to form a relief 13 representing the desired information.

There are different laminating methods for finishing off the identification card without any problem, depending on the type of blowing agent and synthetic material used.

When chemical blowing agents are used, care must be taken that the laminating temperature does not exceed the starting temperature of the blowing agent so that the latter is not activated accidentally. Hot laminating PVC cover films involves temperatures as high as 180° C., for example, so that in this case chemical blowing agents can only be used if their starting temperature is greater than 180° C. Azodicarbonamide is suitable, for example, with its starting temperature of 230°–235° C.

When chemical blowing agents with lower starting temperatures (90°–180° C.) are used, suitable methods are cold lamination and other special gluing methods which work at relatively low temperatures and are sufficiently well-known in the laminating field.

When physical blowing agents are used, care must be taken that the blowing agent does not expand during lamination, which can be achieved either by cooling at the same time as high laminating pressure is maintained during the hot laminating process, or by using cold laminating techniques. For the sake of simplicity, only the use of chemical blowing agents is dealt with in this and in further embodiments. However, all embodiments may be realized just as well with physical blowing agents.

The energy necessary to activate the chemical blowing agent embedded in cover film 11 (FIG. 2) is supplied by a laser beam recorder, preferably an Nd-YAG LASER which works at a wavelength of 1024 nm, the dosage of energy—period of exposure and intensity—, the thickness of cover film 11 and the amount of blowing agent contained in the latter being coordinated with the desired height of the relief. In order that the blowing agent reach its starting temperature, sufficient laser energy must be absorbed or converted into heat energy in cover film 11 which contains the blowing agent. If the layer provided with blowing agents is not sufficiently absorptive, this may be obtained, for example, by printing or additionally laminating an absorptive layer 15 onto inlay 10 in the area 5 intended for the data in relief. This causes the laser energy to be particularly well absorbed and the resulting heat is then conducted to cover film 11 with its embedded blowing agent. Another possibility, which may also be used additionally, for guaranteeing sufficient absorption of laser energy is to use properly prepared cover films 11 which are compounded with substances which absorb laser energy particularly well. When using an Nd-YAG LASER which works in the very near infrared, particularly well-suited films have proved to be PVC films of the ALKOR PLAST CC-0-013 type, which are completely transparent in the visible range but exhibit a linear absorption coefficient in the wavelength range of the laser beam recorder which is almost 20 times greater than in the case of films otherwise used in laminating techniques.

When the production of the data in relief is followed by photocuring, this allows for other information 4,16 to be inscribed in the card inlay with the same laser beam recorder. When azodicarbonamide is used, deactivation of the blowing agent is achieved by mere exposure to UV light; in the case of other blowing agents, photosensitizers and reactive plasticizers which also cause photocuring when exposed to UV light are added to the foamable synthetic material. Photocuring effectively prevents both attempted forgery by re-embossing and accidental deformation of the card surface due to accidental overheating of the card.

Figure 3:
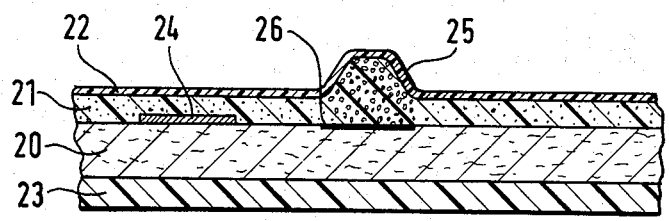

A further embodiment of an inventive identification card is shown in FIG. 3 in cross-section. The two-layer transparent cover film used comprises an upper PVC protective layer 22 which is also completely transparent for the laser beam recorder, and synthetic layer 21 which contains a chemical blowing agent with a high starting temperature. A thermosensitive coating 24, which reacts to even relatively little heat supplied by the laser beam recorder with a locally definite and visible change of color representing the desired information, is applied to inlay 20 for the production of normal laser writing, i.e. writing not in relief, over a large surface, at least in the card area intended for it (e.g. area 3, FIG. 1). Thermosensitive substances which may be used for this purpose are sufficiently well-known, for example, from German patent no. 29 07 004 or German patent no. 695 406.

The entire personalization of the identification card can thus take place in one device, the inscription of the personalization data 4 (FIG. 1) in the thermosensitive layer 24 located on card inlay 20 being activated by a smaller energy dosage, and the production of the data in relief 6 (FIG. 1) or data in relief 25 by a greater energy dosage of the laser beam recorder. The point at which thermosensitive layer 24 changes color and the starting temperature of the blowing agent must, of course, be coordinated with one another in such a way that the blowing agent in cover film 21 is not activated when thermosensitive layer 24 is being written on.

The absorption of the laser light to activate the blowing agent takes place in this embodiment not so much in cover film 21 itself but rather in card inlay 20, from which the heat energy is passed on to cover film layer 21 containing the blowing agent. In the process, card inlay 20 is itself burned or discolored in the area of the data in relief, so that the information is present both in the form of a relief structure (25) in cover film 21,22 and in the form of congruent discoloration 26 in card inlay 20. A falsifier would have to change not only the surface relief but also the congruent data in the inlay, so that data manipulation is made even more difficult.

Figure 4:
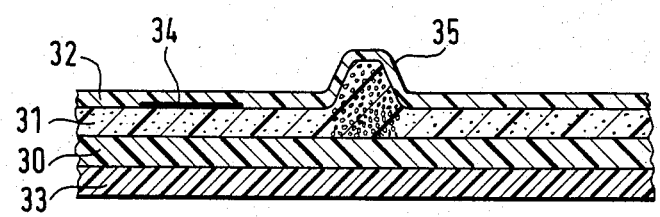

The embodiment shown in FIG. 4 is an identification card with a two-layer all-plastic inlay 30,32 laminated in between two transparent cover films 32,33. The upper synthetic layer 31, which is tinted in any way one chooses and may also be provided with printed pattern 34, contains the blowing agent to be activated by the supply of heat, whereas the lower layer consists of conventional identification card materials such as PVC, PETP, etc. The advantage of this embodiment is the fact that layer 31 is preferably processed in a tinted form so that less demands need be made on the color of the foaming substances. Thus the selection of usable photocurable and foamable synthetic materials may be increased even further for this case of application.

Figure 5:
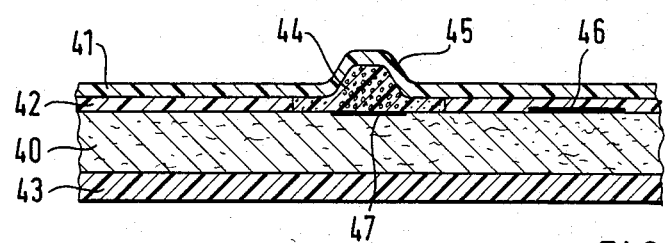

The embodiments shown in FIGS. 5, 6 and 7 are examples of an identification card which may be embossed by a laser, in which the synthetic layer containing the blowing agent is not provided over the entire surface of the identification card but rather is located only in the area 5 (FIG. 1) intended for the data in relief.

FIG. 5 shows an identification card with a card inlay 40, which is preferably designed as security paper, laminated in between transparent cover films 41, 42 and 43. Synthetic material 44, which is foamable and contains the blowing agent, is provided only in the area 5 (FIG. 1) intended for data in relief 45, which is achieved, for example, during the production of the identification card by inserting this strip 44 into a recess in compensating film 42 and then laminating card layers 40,41,42,43. By appropriate control of the laser energy, writing 47 on inlet 40 can be provided congruently to the data in relief in this case as well. It is possible to write further normal laser data 46 in area 3 (FIG. 1) of card inlay 40 without any problem and without taking any additional measures in this case, since there is no blowing agent in cover film 41,42 in the other card areas. If the above-mentioned film which absorbs laser light (ALKOR PLAST CC-0-013) is used as the cover film material for layers 41 and/or 42, film 41 and/or 42 may also be written on themselves.

FIG. 6 describes a form equivalent to FIG. 5, in which the two cover films have only been interchanged so that upper cover layer 61 exhibits synthetic material 64 compounded with a blowing agent.

FIG. 7 shows a development of the embodiment of an inventive identification card with an all-plastic inlay described in FIG. 4, in which synthetic material 54 containing the blowing agent in the area 5 (FIG. 1) intended to receive the data in relief 55 is embedded in the two-layer synthetic inlay 50,51 which is tinted and may possibly be provided with a printed pattern. In the case in question, film strip 54 is inserted into the recess in film 50. However, it is equally feasible to achieve the same effect by spreading in a strip containing a blowing agent and matching the color of layer material 50.

Instead of providing a synthetic layer containing a blowing agent only in the area 5 (FIG. 1) intended for the data in relief, as described in FIGS. 5, 6 and 7, and thus guaranteeing that areas 3 and 5 are written on simultaneously and without any problem (FIG. 1, "laser writing" and FIG. 1, data in relief, respectively), it is of course also possible to work with synthetics containing a blowing agent which cover the entire surface and leave out the area 3 intended for the "laser writing" and/or fill it in with a normal or laser-absorptive film material, which also guarantees that the writing is performed simultaneously and unproblematically with the same laser beam recorder (layer 42 in FIG. 5, recess at 46; layer 50 in FIG. 6, recess at 56; layer 61 in FIG. 7, recess above 66 in layers 61 and 62). If synthetic layers containing a blowing agent are used which cover the entire surface, as described in FIGS. 2, 3 and 4, the same purpose can be fulfilled by selective photocuring carried out before the laser writing or selective deactivation of the blowing agent by exposing it to UV light, leaving out the area 5 (FIG. 1) intended for the data in relief.

In all the embodiments described above, the absorption of the energy of the laser beam recorders necessary for foaming takes place via the card inlay, additional embedded absorptive layers or appropriate additives in the film material. By an appropriately high dosage of the laser energy, the information present in the form of data in relief may also be additionally inscribed in the card inlay congruently to the structure in relief.

FIGS. 8 and 9 show a method by which it is possible to produce data in relief independently of the absorptive behavior of the cover film and the inlay of the identification card. Card inlay 70 laminated in between two cover films 71,72 is exposed to laser light 75 through a film 73 in the area intended to receive the data in relief. Film 73 is provided with an absorptive layer 74 having particularly high absorptive power in the wavelength range of the laser beam recorder. The laser energy taken up by absorptive layer 74 is passed on to cover film 71 containing a blowing agent so that the desired structure in relief 67 is formed. Absorptive layer 74 may be designed in such a way that it sticks to the surface 66 of the structure in relief, as shown in FIG. 9, or partly diffuses into the synthetic material and enters into combination with it. Preferably, in this case of application, layer 74 is black or otherwise greatly contrasts with the general color of the identification card so that the relief is dyed automatically and in a visually quite legible manner during the writing process itself. If the recognition of congruent writing on the inlay is to be guaranteed, it is also possible to use an absorptive layer 74 which does not enter into combination with the identification card material or cause any visually recognizable discoloration in same.

An appropriate absorptive layer 74 in the most simple case for the above-mentioned Nd-YAG-LASER emitting in the very near infrared is a carbon black layer which is applied to film 73 by means of a suitable binding agent or electrostatically. The embossed data thus receive surface coloration 66 which cannot be removed without destroying the structure in relief.

Summing up, various procedures for simultaneously writing data in relief and normal laser data on identification cards in the same device shall be reviewed below.

Procedure 1:

The foamable and photocurable or deactivated synthetic material forms a layer over the surface of the identification card (as a cover film or inlay layer). The finished identification card is provided with data in relief in the laser device, UV cured and then inscribed with the normal laser data.

Procedure 2:

The photocurable or deactivated synthetic material compounded with a blowing agent with a high starting temperature forms a layer covering the identification card. A thermosensitive layer is located in the area of the normal laser data, e.g. on the card inlay. The normal laser data are inscribed with a small dosage of laser energy adapted to the point of color change of the thermosensitive layer; the data in relief are produced with a large dosage of laser energy sufficient to activate the blowing agent. The foamable synthetic layer may then be cured by exposure to UV light.

Procedure 3:

The identification card contains a layer containing a blowing agent and covering its surface and is photocured by means of UV light, leaving out the data intended for the data in relief. The data in relief and the other data present in the form of normal laser writing are then inscribed in the appropriate areas with the laser beam recorder. The area bearing the data in relief is then UV cured.

Procedure 4:

The identification card contains a layer containing a blowing agent covering its entire surface, having a recess only in the area intended for normal laser data and provided with a conventional synthetic material. Data in relief and normal laser data are then inscribed by means of the laser beam recorder. The identification card is then photocured by exposure to UV light.

In order to assure sufficient absorption of the laser light, the methods explained in detail above may be used: additional laser-absorptive layers on the inlay, absorption in the cover film by means of added laser-absorptive materials, absorption via the card inlay (paper, synthetic material or printed pattern) and absorption via layers applied only during the writing process.

We claim:

1. A multilayer identification card comprising a plurality of layers of material, at least one card surface made of synthetic material bearing a structure in relief useable as a printing block, wherein the structure in relief (13, 25, 35, 45, 55, 65, 67) is formed of foamable synthetic material (11, 21, 31, 44, 54, 64, 71) which has been foamed by absorption of energy from an energy source irradiating the card surface.

2. An identification card as in claim 1, wherein thermoplasts with chemical or physical blowing agents are used as the foamable synthetic material (11, 21, 31, 44, 54, 64, 71).

3. An identification card as in claim 1, wherein the foamable synthetic material is photocurable.

4. An identification card as in claim 2, wherein the foamable synthetic material is photocurable.

5. An identification card as in any one of claims 1-4, wherein the foamable synthetic material is visually transparent.

6. An identification card as in one of claims 1-4, wherein the foamable synthetic material is dyed.

7. An identification card as in claims 1 or 2, wherein the foamable synthetic material is particularly absorbent in the wavelength range of a laser beam recorder.

8. An identification card as in claims 1 or 2, wherein the foamable synthetic material is provided in the form of an upper cover film (11, 71) covering the surface of the card.

9. An identification card as in claims 1 or 2, wherein the foamable synthetic material is provided in the form of a lower layer (21) covering the surface of a two-layer cover film, protected by a transparent upper layer.

10. An identification card as in claims 1 or 2, wherein the foamable synthetic material is provided in the form of a strip-shaped layer portion (44, 64) in a cover film.

11. An identification card as in claims 1 or 2, wherein the foamable synthetic material is provided in the form of a layer covering the surface of a card inlay.

12. An identification card as in claims 1 or 2, wherein the foamable synthetic material is provided in the form of a strip-shaped layer (54) in a card inlay.

13. An identification card as in claims 1 or 2, wherein the foamable synthetic material is particularly absorbent in the wavelength range of a laser beam recorder, wherein additional special absorbant layers are embedded in an area (5) intended to receive the structure in relief to increase the absorption of an energy of a laser beam recorder.

14. An identification card as in claim 1, wherein the foamable synthetic material is particularly absorbent in the wavelength range of a laser beam recorder, and wherein a thermosensitive layer (24) is embedded in an area provided to receive imprintation of data in a variety other than in relief.

15. An identification card as in claims 1 or 2, having a card inlay and a cover film, wherein a change of color in the card inlay (26, 27) or in the cover film is produced congruently to the structure in relief (25, 45).

16. An identification card as in claims 3 or 4, wherein the foamable synthetic material is cured by photocuring at least part of its surface.

17. A method of producing an information carrier structure in relief useable as a printing block comprising the steps of: forming a multilayer card structure having at least one layer of foamable synthetic material; and selectively irradiating said foamable material with a laser beam to cause said foamable synthetic material to foam where irradiated, thereby forming a structure in relief on at least one surface of said card whereby said structure in relief is useable as a printing block.

18. A method as in claim 17, wherein the height of the relief is precisely controlled by adjusting the laser energy as to its intensity and exposure time.

19. A method as in claims 17 or 18 wherein prior to the irradiating step, the following step is performed: A film, having an absorptive layer, is placed between the laser and the information carrier structure so that the absorptive layer is adjacent to the information carrier strucuture; during the irradiating step, foaming the foamable material by the heat generated in the absorptive layer of the film; and subsequently detaching the film from the portion of the absorptive layer which adhered to the relief structure so that the surface of the relief structure adopts the color of the absorptive layer.

20. A method as in claim 19, wherein the absorptive layer is visually transparent so that no change of color is produced on the surface of the relief.

21. A method as in claims 17 or 18, wherein during the irradiating step, an Nd-YAG-LASER emitting at a wavelength of 1024 nm is used as a laser beam recorder.

22. A method as in claims 17 or 18 wherein the layer of foamable synthetic material used during the forming step is photocurable; and wherein after the irradiating step, the following steps are performed: the structure is photocured by exposure to UV light and the structure is irradiated by a laser beam to produce data on the structure which is of a variety other than in relief.

23. A method as in claims 17 or 18 wherein the layer of foamable synthetic material used during the forming step is photocurable and compounded with a blowing agent with a high starting temperature in the portion of the structure which is to be provided with data in relief; wherein during the forming step, the structure is provided with a layer of thermosensitive material in the portion of the structure which is to be provided with data in a different color; and wherein during the irradiation step, providing at first a relatively high dose of laser energy so that the starting temperature of the blowing agent is reached, thereby forming structure in relief and providing subsequently, a relatively low dose of laser energy thereby producing data in a different color.

24. A method as in claim 23 including the step of photocuring the information carrier structure subsequent to the irradiation step.

25. A method as in claims 17 or 18 wherein during the forming step, the structure is provided with a layer containing a blowing agent; wherein subsequent to the forming step, photocuring the structure by exposure to UV light with the exception of the area intended for the data in relief; and wherein the irradiation step includes a step of irradiation which imprints data of a variety other than in relief.

26. A method as claimed in claims 17 or 18 wherein during the forming step, the structure is provided with a layer containing a blowing agent exclusively in an area intended for the data in relief; and wherein the irradiating step includes a step of irradiation which imprints data of a variety other than in relief in an area of the information carrier structure exclusive of the area containing a blowing agent.

27. A method as claimed in claim 17 or 18 wherein during the forming step, the structure is provided with a synthetic layer of material containing a blowing agent; the layer is provided with a recess in the area of the information carrier structure which is intended for data in a form other than in relief; the recess is filled with material other than material containing a blowing agent; the synthetic material containing a blowing agent is photocured by exposure to UV light.

28. A method as in claims 17 or 18 wherein during the step of forming the information carrier structure, the layer of foamable synthetic material is provided with a covering layer which is comparatively more wear resistant than the layer of foamable synthetic material.

29. A method as proposed in claims 17 or 18 wherein after the step of irradiating, the layer of foamable synthetic material is provided with a covering layer which is comparatively more wear resistant than the layer of foamable synthetic material.

30. A multilayer identification card bearing a structure in relief useable as a printing block made by a process having the following steps: forming a multilayer card structure having at least one layer of a foamable material; selectively irradiating the foamable material to cause the foamable material to foam and thereby form the structure in relief in the portions of the card which have been selectively irradiated.

* * * * *